United States Patent [19]
Chang et al.

[11] Patent Number: 6,084,021
[45] Date of Patent: Jul. 4, 2000

[54] MODIFIED UREA-FORMALDEHYDE BINDER FOR MAKING FIBER MATS

[75] Inventors: Shau-Gan Chang, Norcross, Ga.; Larry R. Graves, Puyallup, Wash.; Charles R. Hunter, Sewickley, Pa.; Stacey L. Wertz, Conyers, Ga.

[73] Assignee: Georgia-Pacific Resins, Inc., Atlanta, Ga.

[21] Appl. No.: 09/224,988

[22] Filed: Jan. 4, 1999

Related U.S. Application Data

[62] Division of application No. 08/859,060, Feb. 6, 1997, Pat. No. 5,914,365.

[51] Int. Cl.$^7$ ............................... B32B 5/02; B32B 9/04; B32B 27/04; B32B 27/42
[52] U.S. Cl. ..................... 524/512; 525/163; 442/63; 442/152; 442/153; 442/155; 442/160; 442/163; 442/164; 442/172; 442/173; 442/176; 442/177; 442/178; 442/179; 442/180
[58] Field of Search ..................... 524/512; 525/163; 442/63, 152, 153, 155, 160, 163, 164, 172, 173, 176, 177, 178, 179, 180

[56] References Cited

U.S. PATENT DOCUMENTS

| | | |
|---|---|---|
| 2,906,660 | 9/1959 | Hungerford et al. . |
| 3,012,929 | 12/1961 | Jackson . |
| 3,050,427 | 8/1962 | Slater et al. . |
| 3,103,461 | 9/1963 | Smith et al. . |
| 3,228,825 | 1/1966 | Waggoner . |
| 3,637,549 | 1/1972 | Hall et al. . |
| 3,760,458 | 9/1973 | Pitt . |
| 3,766,003 | 10/1973 | Schuller et al. . |
| 3,838,995 | 10/1974 | Smith . |
| 3,905,067 | 9/1975 | Keib et al. . |
| 4,258,098 | 3/1981 | Bondoc et al. . |
| 4,560,612 | 12/1985 | Yau . |
| 4,917,764 | 4/1990 | Lalwani et al. . |
| 5,362,842 | 11/1994 | Graves et al. . |
| 5,389,716 | 2/1995 | Graves . |

FOREIGN PATENT DOCUMENTS 0 379 087 A2   7/1990   European Pat. Off. .

OTHER PUBLICATIONS

International Search Report for PCT/US 98/02477 (Docket No. 05242.73320).

*Primary Examiner*—Nathan M. Nutter
*Attorney, Agent, or Firm*—Banner & Witcoff, Ltd.

[57] ABSTRACT

An aqueous binder composition containing a urea-formaldehyde resin modified with a water-soluble styrene-maleic anhydride copolymer is used in the preparation of fiber mats.

8 Claims, No Drawings

MODIFIED UREA-FORMALDEHYDE BINDER FOR MAKING FIBER MATS

CROSS-REFERENCE TO RELATED APPLICATION(S)

This application is a Divisional Application of parent U.S. patent application designated by Ser. No. 08/859,060, herein by reference in its entirety, filed on Feb. 6, 1997 and now U.S. Pat. No. 5,914,365.

BACKGROUND OF THE INVENTION

1. Field of the Invention

The invention relates to a modified, thermosetting urea-formaldehyde resin composition useful as a binder for making fiber mats, to fiber mats prepared using the modified urea-formaldehyde resin composition as a binder, and to a process of preparing the mats using the binder. In particular, the invention relates to a fiber mat binder composition comprising a thermosetting urea-formaldehyde resin (UF) modified by the addition of a water soluble styrene-maleic anhydride copolymer (SMA).

2. Background of the Invention

Glass fiber mats and fiber mats made from other synthetic fibers are finding increasing application in the building materials industry, as for example, in composite flooring, in asphalt roofing shingles, or siding, replacing similar sheets traditionally made using wood, cellulose or asbestos fibers.

Fiber mats, and especially glass fiber mats, usually are made commercially by a wet-laid process, which is carried out on what can be viewed as modified paper-making machinery. Descriptions of the wet-laid process may be found in a number of U.S. patents, including U.S. Pat. Nos. 2,906,660, 3,012,929, 3,050,427, 3,103,461, 3,228,825, 3,760,458, 3,766,003, 3,838,995 and 3,905,067. In general, the wet-laid process for making glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated therefrom.

Unlike natural fibers such as cellulose or asbestos, glass fibers do not disperse well in water. To overcome this problem, it has been the industry practice to provide suspending aids for the glass fibers. Such suspending aids or dispersants usually are materials which increase the viscosity of the aqueous medium. Suitable dispersants conventionally employed in the art include polyacrylamides, hydroxyethyl cellulose, ethoxylated amines and amine oxides. Other additives such as surfactants, lubricants and defoamers also have conventionally been added to the white water. Such agents, for example, further aid the wettability and dispersion of the glass fibers. Experience has shown that such additives also often influence the strength of the wet glass fiber mat.

The fiber slurry depositied on the moving screen or cylinder is processed into a sheet-like fiber mat by the removal of water, usually by suction and/or vacuum devices, and is followed by the application of a polymeric binder to the mat. In the manufacture of glass fiber mats, a high degree of flexibility and tear strength is desired in the finished mat in addition to primary dry tensile and wet tensile properties. A binder composition is therefore used to hold the glass fiber mat together. The binder composition is impregnated directly into the fibrous mat and set or cured immediately thereafter to provide the desired mat integrity. The binder composition is applied to the mat by soaking the mat in an excess of binder solution or suspension, or by impregnating the mat surface by means of a binder applicator, for example, by roller or spray. The primary binder applicator for glass mat machines has been the falling film curtain coater. Suction devices often are also utilized for further removal of water and excess binder and to ensure a thorough application of binder through the glass fiber mat. A widely used binder is based on a urea-formaldehyde resin commonly fortified with an emulsion polymer. UF resins have been employed because they are relatively inexpensive. In addition to mat strength properties which the binder composition imparts to the ultimately cured mat, the binder also functions to improve the strength of the uncured, wet-laid mat as it is transported from its initial formation into and through the curing oven. Such incipient pre-cured strength is needed to avoid process delays and shutdowns caused by breaks in the endless mat.

Thus-incorporated binder is thermally cured, typically in an oven at elevated temperatures. Generally, a temperature in the range of about 200 to 250° C. is used during curing. Normally, this heat treatment alone will effect curing of the binder. Catalytic curing, such as is accomplished with addition of an acid catalyst (for example, ammonium chloride or p-toluene sulfonic acid), generally is a less desirable, though an optional, alternative.

Because glass fiber mats made with a binder consisting essentially of a UF resin often are brittle, or because the strength properties of the mats may deteriorate appreciably subsequent to their preparation, especially when the mats are subjected to wet conditions, UF resin binders have commonly been modified by formulating the UF resin with cross-linkers and various catalyst systems or by fortifying the UF resin with a large amount of latex (emulsion) polymer, usually a polyvinyl acetate, vinyl acrylic or styrene-butadiene. Certain latexes can provide increased wet tensile strength and tear strength. The use of styrene-butadiene latex-modified, urea-formaldehyde resin compositions as a binder for glass fiber mats is disclosed, for example, in U.S. Pat. Nos. 4,258,098; 4,560,612 and 4,917,764.

The present invention is directed to an improved (modified) thermosetting urea-formaldehyde resin-based binder composition useful as a binder for making fiber mats, particularly glass fiber mats, to fiber mats prepared using the modified urea-formaldehyde resin composition as a binder, and to a process of preparing the fiber mats using the binder. In particular, the invention relates to a fiber mat binder composition comprising a thermosetting urea-formaldehyde resin (UF) modified by the addition of water soluble styrene-maleic anhydride copolymer (SMA).

BRIEF DESCRIPTION OF THE INVENTION

The invention is directed to an aqueous fiber mat adhesive binder composition principally based on a thermosetting urea-formaldehyde (UF) resin. The invention is more specifically directed to an aqueous binder composition containing as its major component a thermosetting, UF resin and as a minor, modifying component a water soluble, styrene-maleic anhydride copolymer (SMA). The invention also is directed to a process for preparing fiber mats, preferably glass fiber mats, using the binder, and to fiber mats produced by the method. The mats are useful, for example, as substrates in the manufacture of roofing shingles and composite flooring.

This invention is based on the discovery that by adding an effective amount of a water soluble, styrene-maleic anhydride copolymer (SMA) to a thermosetting urea-formaldehyde resin-based binder and using the modified composition as a fiber mat binder, fiber mats having improved tensile properties can be produced. Glass fiber mats made using the modified binder composition of the invention exhibit enhanced wet tensile strength, wet mat strength, tear strength, and dry tensile strength. These are all desirable properties of glass fiber mats used in the roofing products industry, such as for making asphalt shingles. The improvement in wet mat strength, i.e., the strength of the binder-impregnated mat prior to curing the binder, observed using the modified binder composition of the invention is particularly striking and surprising relative to the existing art. Becuase of this strength improvement, mat processing or running speeds through the cure oven can be significantly increased without risking breakage of the endless mat. As a result, the equipment used for making fiber mats using the SMA-modified, UF binder composition of the present invention can be operated at more severe cure conditions and thus can be operated under conditions that yield a more rapid rate of cure relative to the conditions available for use with the conventional UF resin binder counterpart.

In manufacturing glass fiber mats in accordance with the invention, fibers, e.g., inorganic fibers such as glass fibers or mineral fibers, are slurried into an aqueous medium. As noted above, the aqueous medium also typically contains a dispersant for facilitating formation of the fiber slurry. Dispersants such as polyacrylamides, hydroxyethyl cellulose, ethoxylated amines and amine oxides are common. The fiber slurry then is dewatered on a foraminated surface to form a wet fiber mat. The SMA modified, UF resin binder of the invention then is applied to the wet mat before it passes through a drying (curing) oven, where the fiber mat is dried and any incorporated binder resin composition is cured. Fiber mats produced in accordance with the invention exhibit excellent wet mat strength, good dry and wet tensile strength and superior tear strength.

DETAILED DESCRIPTION OF THE INVENTION

The process of forming a fiber mat, and especially a glass fiber mat in accordance with the present invention begins with chopped bundles of glass fibers of suitable length and diameter for the intended application. While reference is made hereinafter to using chopped bundles of glass fibers, other fiber types, e.g., mineral fibers and synthetic fibers and other forms of fibers such as continuous strands, may also be used. Generally, fibers having a length of about ¼ inch to 3 inches and a diameter of about 3 to 20 microns are used for most applications. Each bundle may contain from about 20 to 500, or more, of such fibers. Suitable fibers are available commercially from Owens-Corning Fiberglass and Schuller. 20 The glass fiber bundles are added to an aqueous dispersant medium to form an aqueous slurry, known in the art as "white water." The white water typically contains about 0.5% glass fibers. Any viscosity modifier or dispersant, including those commonly used in the past, can be used in the practice of the present invention including hydroxyethyl cellulose, ethoxylated amines, polyacrylamides, amine oxides and the like. Polyacrylamide and amine oxide white water systems have proven to be particularly compatible with the binder composition of the present invention. The amount of viscosity modifier used should be effective to provide the viscosity needed to suspend the glass fibers in the white water as needed to practice the method used to form the wet laid mat. The white water viscosity is generally in the range of 1 to 20 cps, preferably 1.5 to 8 cps. The fiber slurry then is agitated to form a workable, uniform dispersion of glass fibers having a suitable consistency. The viscosity modifier also may contain other conventional additives known in the art. These include dispersion aids, surfactants, lubricants, defoamers and the like.

The fiber/water dispersion then is passed to a mat-forming machine typically containing a mat forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

The binder composition of the invention then is applied to the gravity- or vacuum-assisted dewatered wet fiber mat. Application of the binder composition may be accomplished by any conventional means, such as by soaking the mat in an excess of binder solution or suspension, or by coating the mat surface with binder by means of a binder applicator, such as a falling film or curtain coater.

The thermosetting urea-formaldehyde (UF) resin used as the major component of the binder composition of the present invention can be prepared from urea and formaldehyde monomers or from UF precondensates in manners well known to those skilled in the art. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the U-F resin is highly water dilutable, if not water soluble.

Many thermosetting urea-formaldehyde resins which may be used in the practice of this invention are commercially available. Urea-formaldehyde resins such as the types sold by Georgia Pacific Resins, Inc. (such as GP-2928 and GP-2980) for glass fiber mat applications, those sold by Borden Chemical Co., and by Neste Resins Corporation may be used. These resins are prepared in accordance with the previous teachings and contain reactive methylol groups which upon curing form methylene or ether linkages. Such methylol-containing adducts may include N,N'-dimethylol, dihydroxymethylolethylene; N, bis(methoxymethyl), N,N'-dimethylolpropylene; 5,5-dimethyl-N,N' dimethylolethylene; N,N-dimethylolethylene; and the like.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3.0%, and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

The second, essential component of the aqueous binder composition of this invention is a water-soluble styrene-maleic anhydride copolymer. Styrene-maleic anhydride (SMA) copolymers that are useful in the present invention are known resins. Such resins are composed of alternating styrene and maleic anhydride monomer units, arranged in random, alternating or block form. For example, suitable SMA copolymers may have the following generalized formula in the unneutralized form:

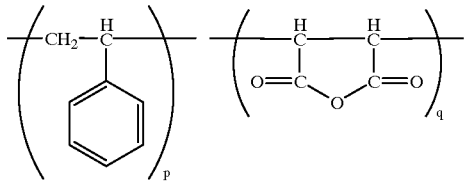

wherein p and q are positive numbers in a ratio (p:q) that can vary from 0.5:1.0 to 5:1. Modified styrene-maleic anhydride copolymers, such as copolymers that are partially esterified or copolymers containing sulfonate groups on the benzene ring, also can be used according to the present invention.

Suitable styrene-maleic anhydride copolymers for practicing the present invention may normally have a weight average molecular weight from about 1,000 to about 500,000. Such unneutralized styrene-maleic anhydride (SMA) copolymers, used in accordance with the present invention, are initially insoluble in water, however after a sufficient extent of neutralization using an alkaline substance, such as a hydroxide, like sodium hydroxide, potassium hydroxide, ammonium hydroxide, lithium hydroxide, or cesium hydroxide; a carbonate, like sodium carbonate, potassium carbonate or ammonium carbonate; ammonia or an amine, the styrene-maleic anhydride copolymers become soluble in water. Any strongly basic alkali metal compound can be used for neutralizing the SMA, such as ammonium hydroxide, potassium hydroxide, sodium hydroxide, lithium hydroxide, cesium hydroxide, ammonium carbonate, potassium carbonate and/or sodium carbonate. Although it generally is desirable to use the neutralizing agent in an amount sufficient to neutralize 100 mole % of the SMA copolymer, in the practice of the invention it is only necessary to neutralize the SMA sufficiently to obtain water solubility. The level of addition of any particular neutralizing agent to obtain an acceptable degree of water solubility is well within the normal skill in the art.

Suitable styrene-maleic anhydride copolymers for use in accordance with the method of the present invention are commercially available from ARCO Chemical Co., ZifAtochem, Georgia Pacific Resins, Inc. and others.

To prepare the aqueous binder, the aqueous thermosetting UF resin solution and the SMA copolymer are simply mixed in a desired proportion under ambient conditions. In order to insure suitable storage stability of the modified binder composition and proper performance during use of the binder composition, it is important that the pH of the aqueous mixture of the UF and SMA components end up within the range of about 6 to 9, and more preferably between about 7 and 8.5. Too low a pH causes premature curing of the UF resin and incompatability of the two constituents; too high a pH retards curing of the composition on heating during use. Suitable binders can be prepared by mixing these two components, on a solids basis, in a UF:SMA weight ratio between about 99.9:0.1 and about 70:30, preferably between about 99.8:0.2 and about 90:10, and most often between 99.8:0.2 and 95:5.

The total concentration of non-volatile components in the aqueous binder composition (predominantly UF resin and SMA copolymer solids) also can vary widely in accordance with the practice of the present invention, but it will usually be found convenient and satisfactory to make up this composition at total solids concentration in the range from about 5 to about 40 percent by weight of the total aqueous binder composition. Total solids from about 20 to about 35 percent by weight are preferred. As used herein, the solids content of a composition is measured by the weight loss upon heating a small, e.g., 1–5 gram, sample of the composition at about 105° C. for about 3 hours. The binder composition may also contain a variety of other known additives such as a silica colloid to enhance fire resistance, antifoamers, biocides, pigments, and the like, normally in small proportions relative to the essential UF resin and SMA copolymer constituents.

The amount of binder applied to the mat also can vary considerably in the broad practice of the present invention, but loadings in the range of about 3 to about 45 percent by weight, preferably about 10 to about 40 percent by weight, and more usually about 15 to about 30 percent by weight, of nonvolatile binder composition based on the dry weight of the bonded mat, will be found advantageous. For inorganic fibrous mats, this value can normally be confirmed by measuring the percent loss on ignition (LOI) of the fiber mat product.

The binder composition of this invention can be employed with any fibers which can be formed into mats in any suitable manner. The fibers may be organic or inorganic, preferably inorganic fibers are used. Inorganic fibers include, but are not limited to, glass fibers, mineral fibers, graphite fibers, metal fibers and metal coated glass or graphite fibers. Asbestos fibers also could be used, but are normally undesirable for health reasons. Organic fibers include, but are not limited to, acrylic, aromatic polyamide, polyester, cellulosic including cellulose, and polyolefin fibers. The fibers generally comprise from about 50 to about 97 percent by weight of solids, in the mat on a dry weight basis. Inorganic fibers are generally preferred.

The binder composition of the invention sets or cures at elevated temperatures below the decomposition temperature of the UF resin and SMA copolymer components. The setting or curing of the binder composition can occur at temperatures from about 135° C. to about 300° C., preferably from about 135° C. to about 275° C. At these temperatures, the binder composition will typically cure in periods ranging from about 2 to about 60 seconds. Although the binder composition may cure more rapidly at higher temperatures, excessively high temperatures can cause deterioration of the binder composition or the fibers of the mat, which in turn causes a deterioration of the bonded mat physical and functional properties.

Following application of the aqueous binder composition to the wet laid mat, the glass fiber mat is dewatered, normally under vacuum, to remove excess binder solution. The mat then is dried and the incorporated binder composition is cured in an oven at elevated temperatures, generally at a temperature of at least about 170° C., more typically 200 to 250° C., for a time sufficient to cure the resin. The amount of time needed to cure the resin is readily determinable by the skilled practitioner. Heat treatment alone is sufficient to effect curing. Alternatively, but generally less desirable, catalytic curing in the absence of heat may be used, such as is accomplished upon the addition of an acid catalyst, e.g., ammonium chloride or p-toluene sulfonic acid. One important advantage that has been observed in connection with the present invention is that the binder of the invention imparts a surprisingly high degree of strength to the wet formed, uncured, binder-impregnated mat. The strength of the so-formed mat is sufficiently enhanced to allow the mat forming operation to run at significantly higher processing speeds than has been conventionally used with mats made using unmodified and latex modified UF resins without risking breakage of the endless mat. Such operation substantially improves the economics of the mat forming operation.

The finished glass mat product generally contains between about 60% and 90% by weight glass fibers and between about 10% and 40% by weight of cured binder, 15–30% of binder being most preferable.

The following examples are intended to be illustrative only and do not limit the scope of the claimed invention.

EXAMPLE 1

In this example, glass mat hand sheets were prepared with glass fibers and binders prepared with the same UF resin and varying amounts of a SMA copolymer. The UF resin was a modified version of Georgia Pacific Resins, Inc.'s 2928 (470T02), while Georgia Pacific Resins, Inc.'s Novacote® 2000 was used as the SMA copolymer. Mats were cured for 20, 30 and 40 seconds at 205° C. Following the cure, strength and other properties of the consolidated mats were measured. The reported percent loss on soak test is conducted on a sample of a mat prepared by soaking the cured mat sample for 10 minutes in slightly agitated 85° C. water, and then drying the mat over night in a forced air oven at 115° C. Equalized tensile number (ETN) is a calculated value obtained from the product of dry tensile and hot-wet tensile divided by mat weight and LOI. The results are presented below in Tables 1A through 1E. The number in parentheses are the 95% confidence intervals.

| TABLE 1A Modified UF Resin | | | |
|---|---|---|---|
| Cure Time (sec) | 20s | 30s | 40s |
| Dry Tensile (lbs) | 102 (20) | 98 (19) | 111 (22) |
| Hot-wet Tensile (lbs) | 27 (9) | 53 (17) | 65 (11) |
| % Retention | 27 | 54 | 58 |
| Tear (grams) | | 382 (59) | 344 (74) |
| LOI (%) | 22.5 | 18.7 | 17.3 |
| Mat Weight (lbs/100 sq ft) | 1.52 | 1.48 | 1.48 |
| % Loss on Soak | 3.7 | 1.7 | 1.5 |
| ETN | 80.5 | 188 | 282 |

| | TABLE 1B UF + 0.1% SMA | | | TABLE 1C UF + 0.2% SMA | | |
|---|---|---|---|---|---|---|
| Cure Time (sec) | 20 | 30 | 40 | 20 | 30 | 40 |
| Dry Tensile (lbs) | 120 (18) | 115 (24) | 139 (21) | 156 (21) | 137 (16) | 133 (30) |
| Hot-wet Tensile (lbs) | 45 (8) | 79 (8) | 84 (15) | 71 (19) | 80 (27) | 94 (10) |
| % Retention | 38 | 69 | 61 | 45 | 58 | 71 |
| Tear (grams) | — | 337 (80) | 254 (23) | — | 296 (48) | 320 (27) |
| LOI (%) | 20.8 | 23.1 | 24.2 | 24.2 | 25.0 | 23.0 |
| Mat Weight (lbs/100 sq ft) | 1.51 | 1.59 | 1.62 | 1.63 | 1.62 | 1.61 |
| % Loss on Soak | 3.4 | 2.2 | 2.5 | 2.4 | 2.6 | 1.2 |
| ETN | 172 | 247 | 298 | 281 | 271 | 338 |

-continued

|  | TABLE 1D<br>UF + 0.5 SMA | | | TABLE 1E<br>UF + 2.0% SMA | | |
| --- | --- | --- | --- | --- | --- | --- |
| Cure Time (sec) | 20 | 30 | 40 | 20 | 30 | 40 |
| Dry Tensile (lbs) | 142 (21) | 146 (29) | 143 (24) | 148 (27) | 171 (32) | 153 (31) |
| Hot-wet Tensile (lbs) | 65 (18) | 88 (21) | 88 (23) | 78 (17) | 120 (17) | 106 (14) |
| % Retention | 46 | 61 | 62 | 53 | 70 | 69 |
| Tear (grams) |  | 331 (53) | 232 (39) |  | 368 (49) | 320 (54) |
| LOI (%) | 22.9 | 22.7 | 20.8 | 22.9 | 22.5 | 23.8 |
| Mat Weight (lbs/100 sq ft) | 1.58 | 1.62 | 1.58 | 1.60 | 1.63 | 1.60 |
| % Loss on Soak | 1.3 | 2.1 | 1.3 | 1.5 | 1.1 | 1.1 |
| ETN | 255 | 349 | 383 | 315 | 560 | 426 |

EXAMPLE 2

In this example, glass mat hand sheets were prepared with glass fibers and binders prepared with the same UF resin (the base resin used in G-P 2992). One binder composition was unmodified, one was modified with the addition of 8 weight percent of an acrylic latex resin available from the Rohm and Haas Company as GL 618, and the final binder composition was the base resin modified with 1 weight percent of a SMA copolymer. As noted, the base UF resin was the resin used in GP 2992 available from Georgia Pacific Resins, Inc., while Georgia Pacific Resins, Inc.'s Novacote® 2000 was used as the SMA copolymer. Mats were cured for 30 and 50 seconds at 205° C. Following the cure, strength and other properties of the consolidated mats were measured. The results are presented below in Table 2. The number in parentheses are the 95% confidence intervals.

TABLE 3

|  | CONTROL | SMA MODIFIED RESIN |
| --- | --- | --- |
| Mat Weight (lbs/100 sq ft) | 1.82 | 1.75 |
| LOI (%) | 26.6 | 24.2 |
| Caliper (inches) | 0.034 | 0.033 |
| Tensile MD Dry (lbs) | 125 | 148 |
| Tensile MD Wet (lbs) | 67 | 94 |
| % Retention | 54 | 64 |
| Tensile CD Dry (lbs) | 90 | 103 |
| Tensile CD Wet (lbs) | 54 | 69 |
| % Retention | 60 | 67 |
| Flex Tensile MD (lbs) | 80 | 110 |
| % Retention | 64 | 74 |
| Flex Tensile CD (lbs) | 70 | 91 |
| % Retention | 78 | 88 |
| Tear MD (grams) | 275 | 342 |
| Tear CD (grams) | 380 | 443 |
| MIT Doublefold MD (folds) | 31 | 61 |
| MIT Doublefold CD (folds) | 40 | 63 |

TABLE 2

|  | UF Resin | | UF resin + 8% latex | | UF Resin + 1% SMA | |
| --- | --- | --- | --- | --- | --- | --- |
| Cure Time (sec) | 20 | 50 | 20 | 50 | 20 | 50 |
| Dry Tensile (lbs) | 146 (16) | 135 (29) | 134 (29) | 147 (25) | 155 (29) | 151 (46) |
| Hot-wet Tensile (lbs) | 62 (17) | 76 (12) | 47 (13) | 74 (17) | 84 (7) | 85 (22) |
| % Retention | 44 | 56 | 35 | 50 | 54 | 56 |
| Tear (grams) | 327 (9) | 354 (42) | 336 (70) | 389 (76) | 411 (104) | 406 (80) |
| LOI (%) | 22.3 | 23.2 | 21.9 | 24.3 | 28.1 | 28.0 |
| Mat Weight (lbs/100 sq ft) | 1.96 | 1.87 | 1.81 | 1.82 | 1.95 | 1.95 |
| Flex Tensile (lbs) | 104 (42) | 90 (28) |  |  | 92 (24) | 97 (21) |
| ETN | 207 | 236 | 159 | 246 | 238 | 235 |

EXAMPLE 3

In this example, glass mats were prepared using a polyacrylamide white water system on a commercial machine using two binders prepared with the same UF resin. The control binder composition was an SBR latex modified UF resin and the other binder composition was the same UF resin modified with the addition of 0.5 weight percent of a SMA copolymer. The control binder composition was GP 2914 available from Georgia Pacific Resins, Inc., with 10% SBR latex added, while Georgia Pacific Resins, Inc.'s Novacote® 2000 was used as the SMA copolymer. Similar operating conditions were used with each. Following the cure, strength and other properties of the mats were measured. The results are presented below in Table 3.

EXAMPLE 4

In this example, glass mat hand sheets were prepared with GAF TN-1 M glass fibers and binders prepared with the same UF resin and varying amounts of a SMA copolymer. The UF resin was GP 2919 available from Georgia Pacific Resins, Inc., while Georgia Pacific Resins, Inc.'s Novacote® 2000 was used as the SMA copolymer. Mats were cured for 60 seconds at 205° C. Following the cure, strength and other properties of the consolidated mats were measured. The Wet Web Strength test is conducted on an uncured sample of mat impregnated with the binder. The mat is supported at its perimeter and a weight is placed on the mat in the center of the suspended mat. The mass which is sufficient to break through the mat is recorded as the test result. Corrected dry tensile and Wet Web Strength, report values corrected to a common binder loading using the LOI value. The results are presented below in Table 4. As before, the number in parentheses are the 95% confidence intervals.

TABLE 4

|  | UF Resin | UF + 0.1% SMA | UF + 0.2% SMA | UF + 0.5% SMA | UF + 1% SMA | UF + 2% SMA |
|---|---|---|---|---|---|---|
| Dry Tensile (lbs) | 133 (30) | 108 (19) | 151 (22) | 158 (17) | 143 (16) | 133 (32) |
| Corrected Dry Tensile | 91 | 97 | 116 | 123 | 115 | 105 |
| Wet Tensile (lbs) | 39 (10) | 61 (17) | 73 (13) | 65 (12) | 76 (18) | 89 (8) |
| % Retention | 29 | 56 | 49 | 41 | 53 | 67 |
| Tear (grams) | 374 | 492 | 476 | 460 | 488 | 429 |
| LOI (%) | 30.7 | 25.6 | 28.3 | 29.1 | 27.7 | 28.0 |
| Mat Weight (lbs/100 sq ft) | 1.87 | 1.70 | 1.80 | 1.72 | 1.76 | 1.77 |
| Wet Web Strength | 46.9 | 188 | 200+ | 200+ | 200+ | 200+ |
| Corrected WW Strength | 32 | 169 | 200 | 200 | 200 | 200 |
| Caliper (inches) | 35.2 | 33.6 | 31.7 | 29.8 | 33.2 | 32.4 |

EXAMPLE 5

In this example, glass mat hand sheets were prepared with binders prepared with the same UF resin. One binder (the control) was unmodified, while the other binder contained 0.5% of an SMA copolymer. The UF resin was G-P 428T45, while Georgia Pacific Resins, Inc.'s Novacote® 2000 was used as the SMA copolymer. Mats were cured for 30 and 45 seconds at 205° C. Following the cure, strength and other properties of the consolidated mats were measured. Results are reported in Table 5. As before, the number in parentheses are the 95% confidence intervals.

TABLE 5

|  | UF RESIN | | UF + 0.5% SMA | |
|---|---|---|---|---|
| Cure Time (seconds) | 30 | 45 | 30 | 45 |
| Dry Tensile (lbs) | 129 (23) | 115 (8) | 129 (12) | 117 (10) |
| Hot-wet Tensile (lbs) | 62 (12) | 65 (9) | 68 (11) | 70 (7) |
| % Retention | 48 | 56 | 53 | 60 |
| Tear (grams) | 449 (86) | 385 (58) | 454 (52) | 608 (56) |
| LOI (%) | 22.1 | 18.4 | 20.7 | 18.6 |
| Mat Weight (lbs/100 sq ft) | 1.55 | 1.50 | 1.57 | 1.53 |
| ETN | 234 | 274 | 272 | 287 |

While the invention has been described with reference to certain preferred embodiments, and exemplified with respect thereto, those skilled in the art will appreciate that various changes, substitutions, modifications and omissions may be made without departing from the spirit of the invention. Accordingly, it is intended that the scope of the present invention be limited solely by that of the following claims.

We claim:

1. A method of making a fiber mat comprising:
   dispersing fibers in an aqueous medium to form a slurry, forming the slurry into a wet fiber mat, applying an aqueous binder composition comprising as a major component a urea-formaldehyde resin and as a minor component a water-soluble styrene-maleic anhydride copolymer to said wet fiber mat, and curing the binder composition at an elevated temperature.

2. The method of claim 1 wherein said aqueous medium contains a dispersant selected from the group consisting of polyacrylamide, hydroxyethyl cellulose and amine oxide.

3. A fiber mat having good tensile properties comprising said fibers bound together with a cured binder, said binder comprising as a major component a urea-formaldehyde resin and as a minor component a styrene-maleic anhydride copolymer.

4. The fiber mat of claim 3 wherein the binder, before curing, contains on the basis of said urea-formaldehyde resin and said water-soluble styrene-maleic anhydride copolymer from 99.8 to 90 percent by weight urea-formaldehyde resin solids and from 0.2 to 10 percent by weight styrene-maleic anhydride copolymer solids.

5. The fiber mat of claim 4 wherein said fibers are selected from the group consisting of glass fibers, mineral fibers, graphite fibers, metal fibers, metal coated glass fibers, metal coated graphite fibers, acrylic fibers, aromatic polyamide fibers, polyester fibers, cellulosic fibers, and polyolefin fibers.

6. The glass fiber mat of claim 5 wherein the glass fiber mat contains about 60 to about 90% by weight of glass fibers and about 10 to 40% by weight of said binder.

7. The glass fiber mat of claim 6 wherein the glass fiber mat contains about 15 to 30% by weight of said binder.

8. A method of making a fiber mat comprising:
   dispersing fibers in an aqueous medium to form a slurry, forming the slurry into a wet fiber mat, applying an aqueous binder composition comprising as a major component a urea-formaldehyde resin and as a minor component a water-soluble styrene-maleic anhydride copolymer to said wet fiber mat, and curing the binder composition at an elevated temperature, wherein a weight to weight ratio of said urea-formaldehyde resin to said styrene-maleic anhydride copolymer is from about 99.9:0.1 to about 70:30, and wherein said elevated temperature is from about 135° C. to about 300° C.

* * * * *

UNITED STATES PATENT AND TRADEMARK OFFICE
CERTIFICATE OF CORRECTION

PATENT NO. : 6,084,021
DATED : July 4, 2000
INVENTOR(S) : Shau-Gan Chang, et al.

Page 1 of 1

It is certified that error appears in the above-identified patent and that said Letters Patent is hereby corrected as shown below:

Column 1,
Line 6, before "herein", -- incorporated -- has been inserted.

Column 2,
Line 31, "subsquent" has been deleted, and -- subsequent -- has been inserted.

Column 3,
Line 16, "Because" has been deleted, and -- Because -- has been inserted; and
Line 55, "20" has been deleted.

Column 5,
Line 11, "N,bis(methoxymethyl)" has been deleted, and -- N,N' bis(methoxymethyl) -- has been inserted; and
Line 13, "N,N-dimethylolethylene" has been deleted, and --N,N'-dimethylolethylene -- has been inserted.

Column 12,
Line 18, "hydroxvethyl" has been deleted, and -- hydroxyethyl -- has been inserted.

Signed and Sealed this

Fourteenth Day of August, 2001

*Attest:*

NICHOLAS P. GODICI
*Attesting Officer*   *Acting Director of the United States Patent and Trademark Office*